United States Patent [19]
Clark et al.

[11] Patent Number: 5,293,775
[45] Date of Patent: Mar. 15, 1994

[54] GAS TURBINE ENGINE TEST CELL

[75] Inventors: Terry A. Clark, East Hartford; Mark W. Peszko, Malborough; John H. Roberts, Bolton; George L. Muller, Middletown; John P. Nikkanen, West Hartford, all of Conn.

[73] Assignee: United Technologies Corporation, Hartford, Conn.

[21] Appl. No.: 970,214

[22] Filed: Nov. 2, 1992

[51] Int. Cl.⁵ ............................................. G01M 15/00
[52] U.S. Cl. ........................................... 73/116; 73/147
[58] Field of Search ................................. 73/116, 147

[56] References Cited

U.S. PATENT DOCUMENTS 2,975,632  3/1961  Ganahl .................................. 73/116
4,537,066  8/1985  Simpson .............................. 73/117.4

OTHER PUBLICATIONS

Current Techniques for Jet Engine Test Cell Modeling, AIAA/SAE/ASME, 18th Joint Propulsion Conference, Jun. 21-23, 1982.

Primary Examiner—Jerry W. Myracle
Attorney, Agent, or Firm—Edward L. Kochey, Jr.

[57] ABSTRACT

Inlet vortex ingestion is deterred when testing an engine (12) in a test cell (10). Ramp structures (26) are installed on the walls blocking 30% to 50% of the flow area. The apex (42) of these ramps is located adjacent the engine inlet (24) with the upstream faces (46) at about a 45° angle.

11 Claims, 3 Drawing Sheets

GAS TURBINE ENGINE TEST CELL

TECHNICAL FIELD

The invention relates to test cells for testing gas turbine engines and in particular to increasing the ability of such a cell to be used with larger engines.

BACKGROUND OF THE INVENTION

Gas turbine engines for aircraft are normally guaranteed for thrust performance. A newly manufactured engine must be tested to determine compliance with the guarantee, for example, a production test "green" run. Thrust measurement is also important during development. Furthermore, later in life, thrust performance testing of an engine is required to evaluate its current status, particularly after a major engine overhaul.

An indoor test cell offers several advantages in performing a test. Such test is less affected by variable wind or unreliable weather conditions and the noise can be attenuated to avoid excessive disturbances.

Certain corrections must be applied to the various test readings in a test cell in order to determine the equivalent outdoor operation. Preferably these corrections should be as low, stable and repetitive as possible to avoid introduction of error. One of the corrections involved is that of the inlet momentum correction.

It is known that under certain conditions inlet vortices can form which are then ingested into the gas turbine engine. This can result in an engine surge event and prevent useful testing from being conducted. In some cases this can even result in compressor blade damage.

Within a bounding stream line the air is accelerated into the entrance of the gas turbine. The secondary airflow between this streamline and the cell walls decelerates with static pressure increase. At a deceleration velocity ratio on the order of 0.4 or 0.5 separation at the cell wall occurs. The separation is non-uniform. This provides sufficient shear gradient in the direction transverse to the flow to promote the formation of a vortex. This vortex may then be ingested into the engine.

Two methods are known to avoid the damaging effects of vortex formation. One approach involves the streamlining of the duct upstream of the engine with a fairing approaching the shape of the outer streamline perimeter directing all of the air flow to the engine inlet. This inherently accelerates the air flow to the full inlet velocity before it enters the engine, thereby requiring a substantial performance inlet momentum correction. Little or no bypass air is required with this approach.

Such a structure is expensive to build, and forces on the structure must be isolated from the measured force. Specific adaption must be made for each engine being tested. Furthermore, this structure can not be easily moved or removed for access to the engine or for changing the engines.

A more customary solution is the provision of adequate bypass flow or secondary flow around the engine. The exhaust from the gas turbine engine enters an exhaust collector passage. This operates as an inductor to draw air into the passage in addition to the exhaust from the gas turbine engine. Accordingly, excess flow is supplied beyond that needed by the gas turbine engine.

Because of this excess flow the velocity ratio is higher and there is less deceleration of the secondary air and a reduced potential for separation at the walls. Furthermore, any separation that does occur is convected downstream of the gas turbine inlet and is not ingested therein.

Experience has shown that bypass ratios greater than 0.75 or 0.8 are acceptable. In order to test an engine of a given thrust and having a particular air flow, at least 1.8 times the engine required flow must be handled by the test cell. For a given test cell size it follows that larger engines have two problems. One, the extremely high air velocities create considerable noise and excessive forces on the various structure required for the test cell. Second, the approach velocities increase requiring substantial thrust correction.

In accordance with prior art concepts the only solution to such a problem is to build a new and larger test cell.

It is an object of the invention to establish a structure which permits the testing of larger higher thrust engines in a given size engine test cell.

SUMMARY OF THE INVENTION

In accordance with the invention acceleration of the bypass flow is accomplished by a partial blockage of the test cell flow area by inlet ramps. These ramps are sized and located so as to not infringe on the peripheral streamline of the air entering the engine. While these attempt to some extent to streamline the inlet, they fall far short of this so that a given size ramp structure may be used with different size inlets. The size, furthermore, is smaller, they may be easily moved, and the construction is less critical.

Such ramps also establish at their apex a sudden enlargement which establishes flow separation at that location. Since the flow separation is established at the same axial location around the periphery, the shear forces do not exist in the peripheral direction establishing the formation of vortexes.

The test cell has a plurality of parallel walls defining an air flow duct. The gas turbine engine may be supported within the duct. An exhaust collector passage removes air from the duct. There are a plurality of ramp structures installed on at least two and preferably four opposing walls of the air flow duct with these ramp structures blocking between 30-50% of the air flow area. This blockage is a location at or adjacent the inlet of the gas turbine engine when the gas turbine engine is supported in the duct. The upstream face of each ramp structure is established at an angle of approximately 45° from the axis.

DESCRIPTION OF THE PREFERRED EMBODIMENT

Figure 1:
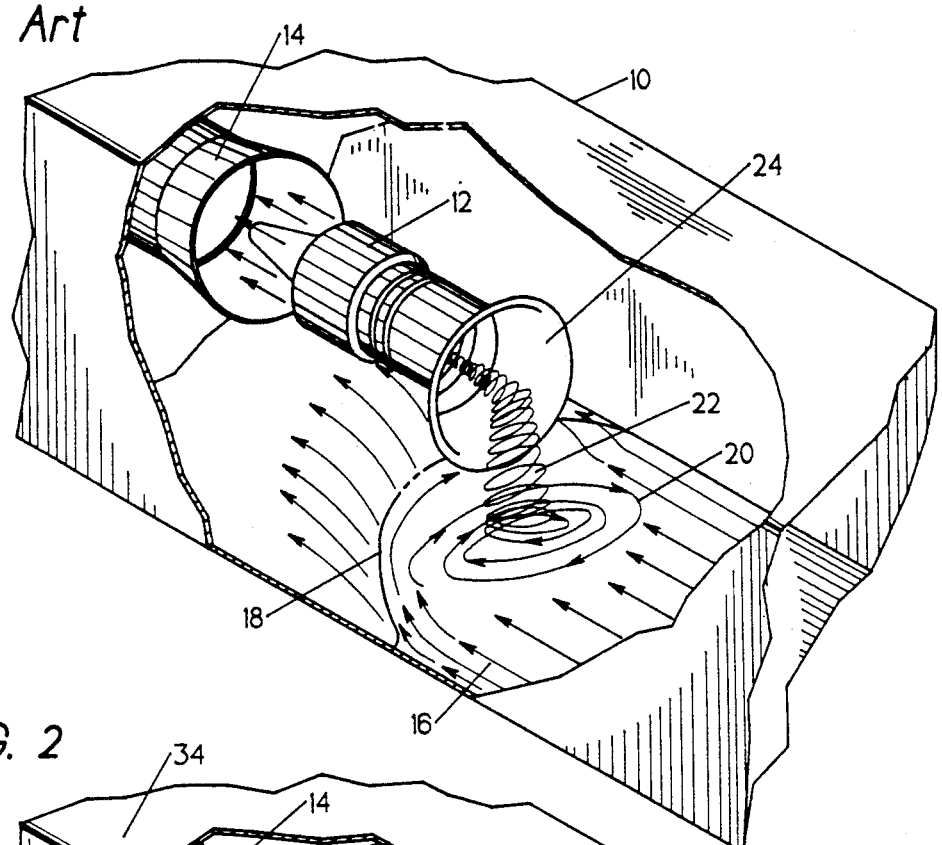
FIG. 1 is an illustration of the prior art showing an ingested vortex.

FIG. 1 shows a prior art test cell 10 with the gas turbine engine 12 supported therein. An exhaust collection passage 14 removes air from the duct. As the airflow 16 passes through the duct, a portion passes into the engine and a portion bypasses the engine. The decrease in velocity and concomitant pressure increase of the by passing air results in a wall separation stagnation of the secondary air indicated by line 18. The shear force in a direction transverse to the directional flow of the air results in a swirl 20 about an axis perpendicular to that of the engine center line, leading to a vortex 22 ingested into the inlet 24 of the gas turbine engine.

Figure 2:
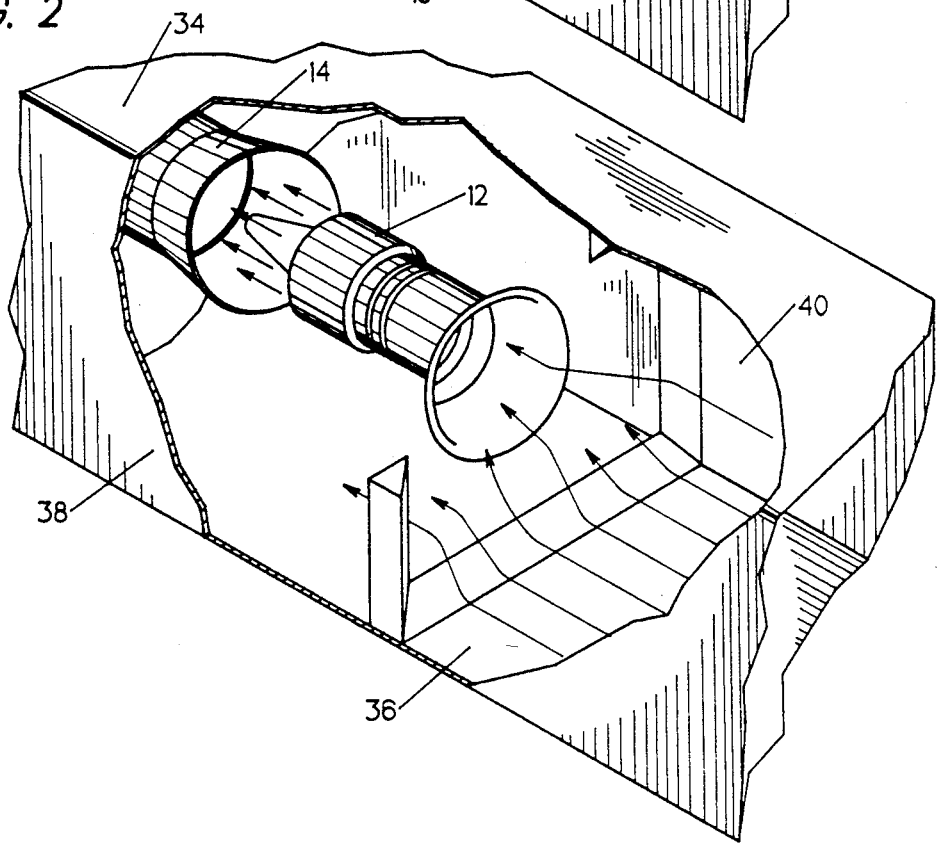
FIG. 2 is an isometric view of an engine in a test cell with the ramps installed.
Figure 3:
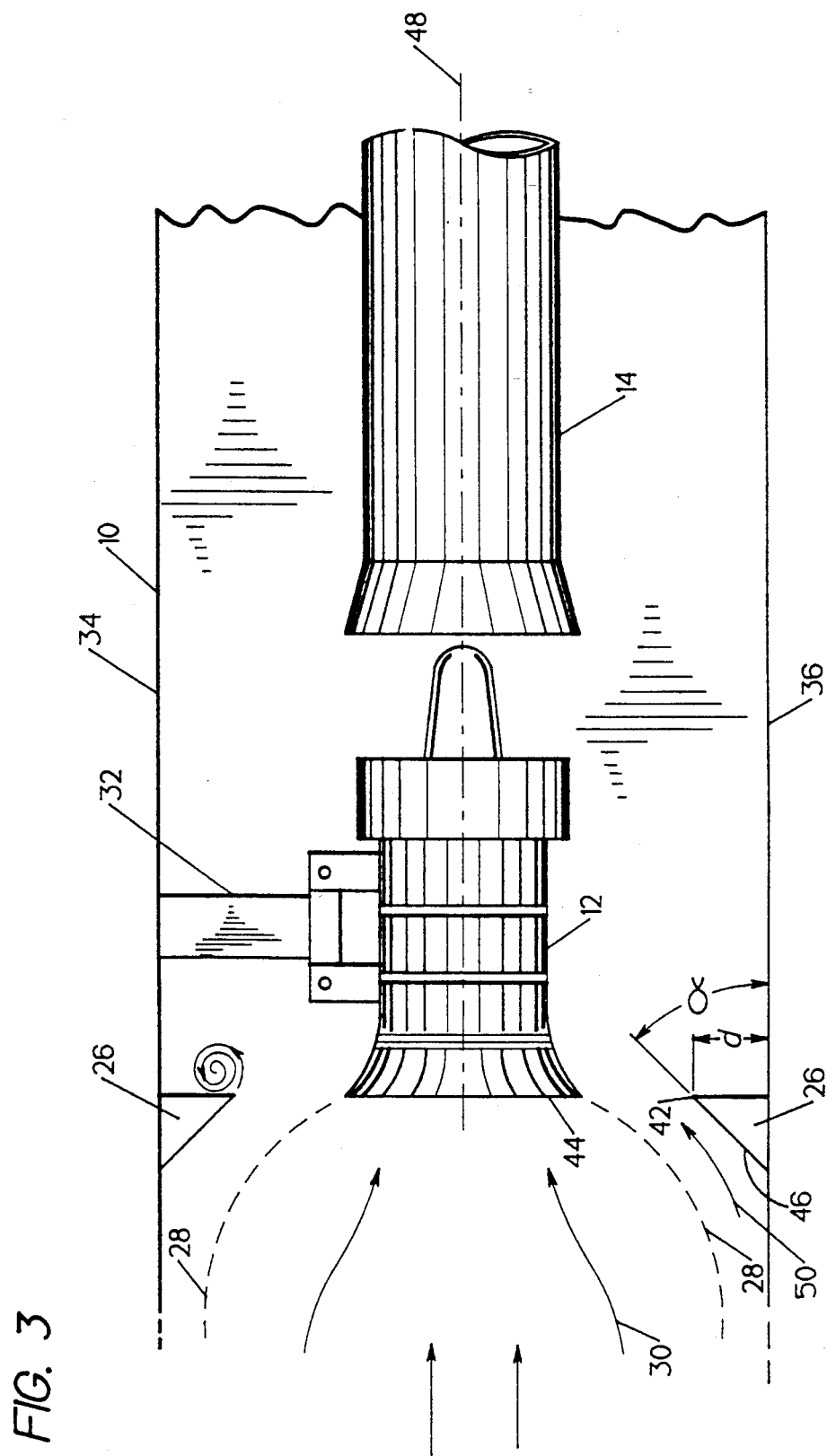
FIG. 3 is a side elevation of an engine in a test cell.

FIGS. 2 and 3 together show the air flow performance with ramp structures 26 of the invention in place. Streamline 28 defines the periphery of flow 30 passing into the gas turbine engine 12. Support 32 adjustably supports the engine in the center of the test duct 10.

The air flow duct 10 is formed of a plurality of planar walls including ceiling 34, floor 36 and sidewalls 38 and 40. In this case the duct is square with a height and width each of 10 meters. Each ramp 26 has an apex 42 with a distance D of 1.06 meter located at or adjacent the inlet bell mouth 44 of the engine. This is selected to provide a blockage of the total flow area of the duct of between 30–50%, and preferably between 36–40%.

The upstream facing surface or ramp 46 is at an angle $\alpha$ of about 45° with the axis 48 of the duct. This provides acceleration of the bypass flow 50 as it approaches the engine inlet without the ramp infringing on streamline 28 of the inlet flow.

A non-uniform separation of the flow from the wall surface is thereby avoided by maintaining a reasonably high velocity upstream of apex 42. Separation occurring immediately downstream of this apex is in a common plane perpendicular to the axis and therefore does not tend to establish inlet vortices.

It can be seen that the apex 42 is a substantial distance away from the inlet 44 and accordingly various size engines may be tested using the same ramp structure. The apex 42 may be moved to a distance not more than 1/10 of the width of the airflow duct (or height if less) upstream of the bell mouth inlet or a distance 1/100 the width downstream of the inlet. In the described duct, this is less than 1 meter upstream and 0.1 meters downstream.

Figure 4:
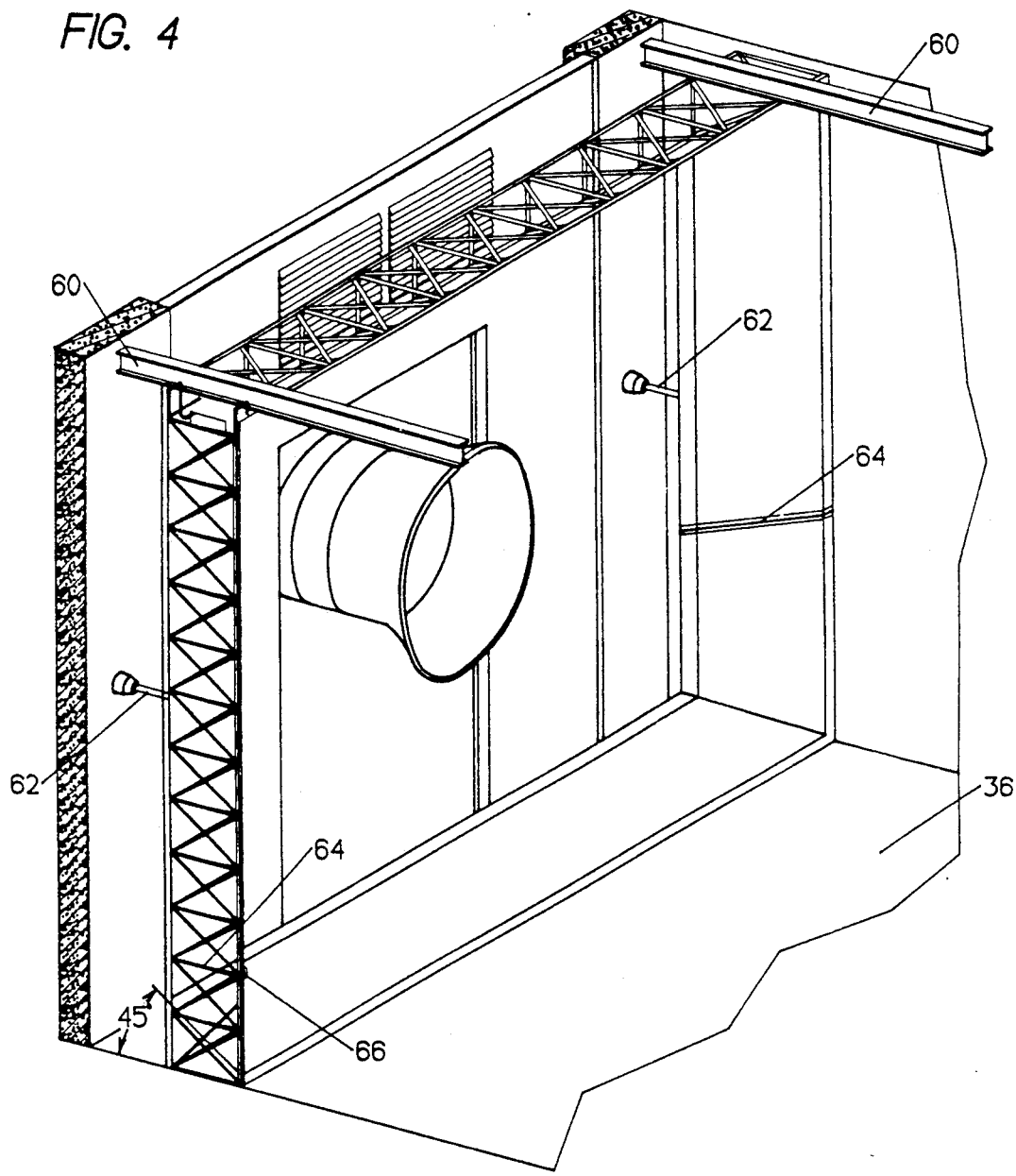
FIG. 4 is an isometric of an engine in a test cell showing more detail of the ramps in the area of the engine inlet.

Referring to FIG. 4, track 60 and actuators 62 can be seen for moving the ramp axially with respect to an installed engine. Divisions 64 in the wall ramps can be seen with hinges 66 being located on one wall. The floor ramps and the lower portion of the wall ramps can therefore be rotated against wall 40 leaving the floor 36 clear for access for installing, removing or maintaining an engine.

I claim:

1. A test cell for testing a gas turbine engine comprising:
    a plurality of planar walls defining an air flow duct, having an axis, a flow area and an upstream end;
    a support for supporting a gas turbine engine having an inlet, within said duct;
    an exhaust collector passage for removing air from said duct;
    a plurality of ramp structures installed on at least two opposing walls of said air flow duct;
    said ramp structures blocking between 30% and 50% of said flow area at a location at or adjacent the inlet of said gas turbine engine, when the gas turbine engine is supported in said duct; and
    each ramp structure having an upstream facing surface at an angle between 40° and 50° from said axis.

2. A test cell as in claim 1 further comprising:
    said plurality of walls comprising four walls.

3. A test cell as in claim 2 further comprising:
    said plurality of ramp structures comprising 4 ramp structures.

4. A test cell as in claim 3 further comprising:
    each ramp structure having an apex being the portion of said ramp structure most removed from the walls on which it is installed; and
    the apex of all ramps being in a common plane which is perpendicular to said axis.

5. A test cell as in claim 4 further comprising;
    said duct having a width W and a height H;
    said apex being upstream of the inlet of an installed engine less than 0.1 H or 0.1 W which ever is less;
    said ramps being axially moveable along said walls to various preselected locations;
    one of said walls being a floor;
    the ramp structure on said floor being a floor ramp structure; and
    said ramp structure hinged adjacent one of said side walls, whereby said floor ramp structure may be swung toward a side wall clearing the central portion of the air flow duct for access; and
    said ramp structures blocking between 36% and 40% of said flow area.

6. A test cell as in claim 3 further comprising
    one of said walls being a floor;
    the ramp structure on said floor being a floor ramp structure; and
    said ramp structure hinged adjacent one of said side walls, whereby said floor ramp structure may be swing toward a side wall clearing the central portion of the air flow duct for access.

7. A test cell as in claim 2 further comprising;
    said duct having a width W and a height H;
    each ramp structure having an apex being the portion of said ramp structure most removed from the wall on which it is installed; portion of said ramp structure most removed from the wall on which it is installed;
    said apex being upstream of the inlet of an installed engine less than 0.1 H or 0.1 W which ever is less.

8. A test cell as in claim 7 further comprising:
    the apex of all ramps being in a common plane which is perpendicular to said axis.

9. A test cell as in claim 2 further comprising:
    said ramps being axially moveable along said walls to various preselected locations.

10. A test cell as in claim 9 further comprising:
    one of said walls being a floor;
    the ramp structure on said floor being a floor ramp structure; and
    said ramp structure hinged adjacent one of said side walls, whereby said floor ramp structure may be swung toward a side wall clearing the central portion of the air flow duct for access.

11. A test cell as in claim 1 further comprising:
    said ramp structures blocking between 36% and 40% of said flow area.

* * * * *